(12) United States Patent
Schlummer

(10) Patent No.: US 8,246,237 B2
(45) Date of Patent: Aug. 21, 2012

(54) APPARATUS AND METHOD FOR THE INTRODUCTION OF A FOAMING AGENT INTO A POLYMER MELT

(75) Inventor: Christian Schlummer, Zurich (CH)

(73) Assignee: Sulzer Chemtech AG, Winterthur (CH)

( * ) Notice: Subject to any disclaimer, the term of this patent is extended or adjusted under 35 U.S.C. 154(b) by 386 days.

(21) Appl. No.: 12/455,342

(22) Filed: Jun. 1, 2009

(65) Prior Publication Data

US 2009/0321975 A1    Dec. 31, 2009

(30) Foreign Application Priority Data

Jun. 25, 2008    (EP) .................................... 08159047

(51) Int. Cl.
*B29C 44/34*    (2006.01)
(52) U.S. Cl. ............................ 366/91; 366/144; 366/336
(58) Field of Classification Search .................... 366/91, 366/144, 336
See application file for complete search history.

(56) References Cited

U.S. PATENT DOCUMENTS

| | | | | |
|---|---|---|---|---|
| 3,751,377 A | * | 8/1973 | Buckner | 521/58 |
| 6,328,916 B1 | | 12/2001 | Nishikawa | |
| 6,783,710 B1 | * | 8/2004 | Walder | 264/40.7 |

FOREIGN PATENT DOCUMENTS

| | | |
|---|---|---|
| EP | 0 079 012 | 5/1983 |
| EP | 0 445 847 A2 | 9/1991 |
| EP | 0 463 759 A | 1/1992 |
| EP | 0 972 626 | 1/2000 |
| WO | WO 2005/044536 A | 5/2005 |

* cited by examiner

*Primary Examiner* — Joseph Del Sole
*Assistant Examiner* — James Sanders
(74) *Attorney, Agent, or Firm* — Francis C. Hand; Carella, Byrne, et al.

(57) ABSTRACT

The apparatus for the production of foams includes an extrusion device for the plastification of a polymer melt, a heat exchanger for the cooling of the polymer melt, and also a connection piece for the connection of the extrusion apparatus to the heat exchanger. The connection piece contains a metering device for the introduction of a foaming agent into the polymer melt.

5 Claims, 2 Drawing Sheets

APPARATUS AND METHOD FOR THE INTRODUCTION OF A FOAMING AGENT INTO A POLYMER MELT

Figure 1:
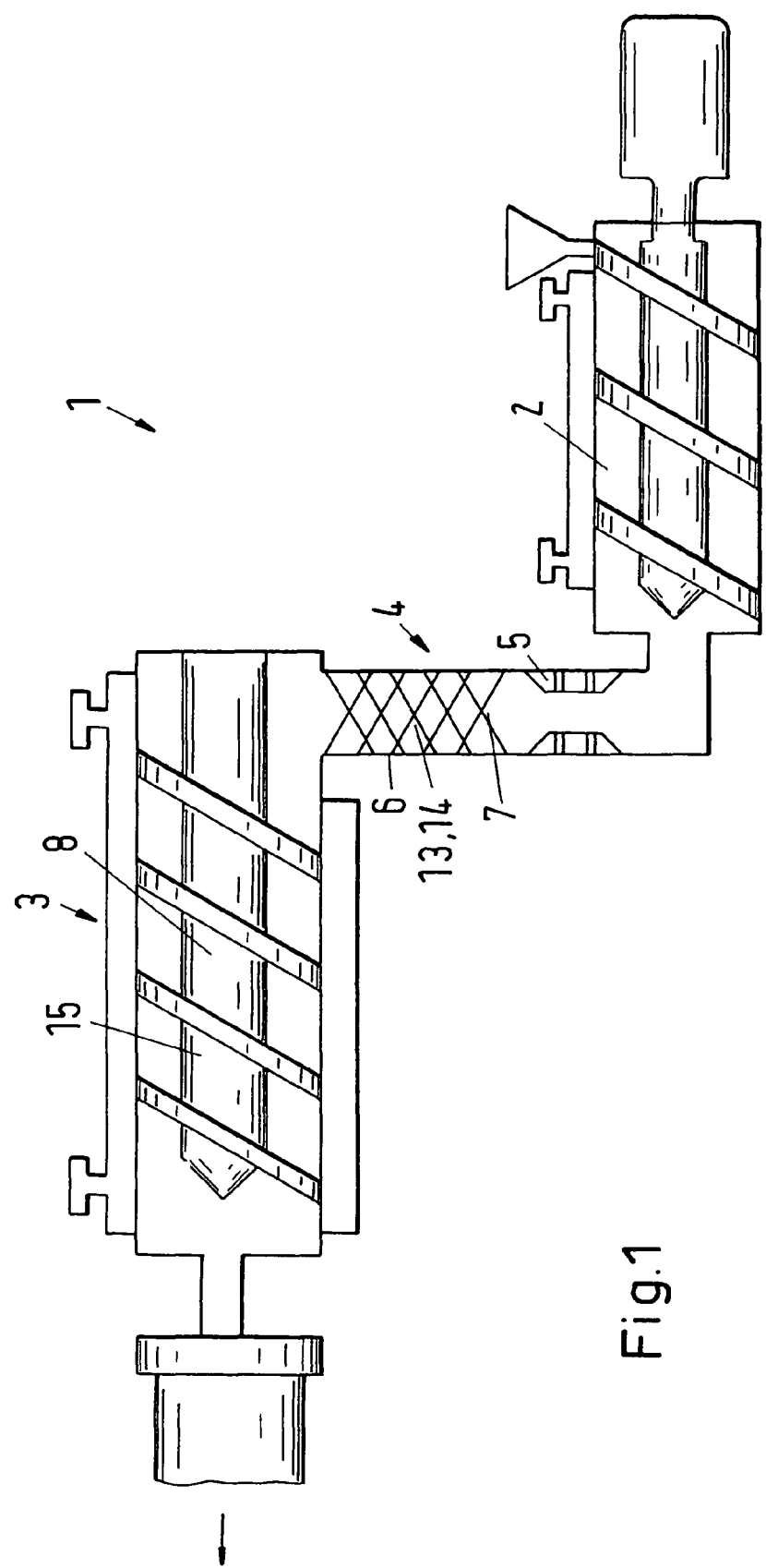

This invention relates to an apparatus and to a method for the introduction of a foaming agent or an additive into a polymer melt for the production of foamed components or semi-finished parts by means of an extrusion method.

An apparatus for the introduction of a foaming agent into a polymer melt is known from DE 198 53 021 A1 for example, which is used to impregnate a polymer melt with a fluid, in particular for the manufacture of foamed shaped parts with an injection moulding machine. To this end, an impregnation body is arranged following a plastification aggregate, into which polymer melt enters, which has been melted in a cylinder containing a rotatable screw. The impregnation body contains a torpedo centered in a melt passage with the outside of the torpedo manufactured from sintered metal. The outer boundary of the annular gap is formed by a cylinder which is likewise manufactured from sintered metal. The foaming agent can be introduced into the melt both via the porous outer shell of the torpedo and also via the sintered metal surface of the cylinder. A disadvantage of this solution is to be seen in the fact that the dissipation of heat is only possible to a very limited extent due to the short construction space. For this reason, the apparatus in accordance with DE 198 53 021 A1 has only been used in injection moulding up until now.

EP1892034 describes an apparatus that is a further development which is also used for extrusion molding. The apparatus described there has a metering device for an additive, in particular a foaming agent, which is fed into a liquid or paste-like medium. In the case of the liquid medium, this can, in particular, be a liquid with a high viscosity, such as a polymer melt for example, and the polymer melt can be used, in particular, in a plant for the production of a foamed shaped part. A conveying apparatus serves for the liquefaction of a polymer which is present as a granulate and the conveying apparatus can, in particular, be formed as an extruder. The conveying apparatus can be designed for an oscillatory movement or can carry out a rotational movement about the common axis of a cylinder and screw piston. An oscillating movement of the screw and/or the screw piston is advantageous if a molding composition is to be metered into an injection molding machine. After the melting in the cylinder, the liquefied polymer enters into a metering apparatus, in which an additive is admixed to the melt which is present as a liquid or paste-like composition. At least one static mixer element is arranged after the metering apparatus, through which a homogenous distribution of the additive in the flow of melt can be realised. To increase the pressure and/or for metering, the molding material emerging from the mixer element is introduced into a compression space and/or a volume storage space, the volume of which can be altered by a feed piston movable to and fro in an injection cylinder.

For thermal treatment of the molding material, the injection cylinder can be equipped with heating apparatuses, at least over one part of the enclosed volume.

The connection passage for the conveying of the molded composition from the shut-off means up to and into the compression storage space and/or to the volume storage space can likewise be provided with a heating apparatus, if a significant temperature drop of the molded material can be found over the length of the passage. Thus, in the scope of the apparatus for the metering of a foaming agent shown in EP 1892034, the heat can not be led away sufficiently, which also runs contrary to the objective of the apparatus in accordance with EP 1892034.

However, the problem still remains that an insufficient cooling capacity is available for large flow rates in a continuous operation, in particular, if foams of low density are to be manufactured. As a result of the high proportion of foaming fluid required, these foams have the characteristic that they collapse if it is not guaranteed that the cell walls have sufficient stability.

A measure of the stability of the cell walls is the melt strength. An increase of the melt strength is achieved by raising the viscosity of the polymer melt, which results in an increased cooling requirement, since the polymer melt has to be cooled to this end. For this reason, the afore-named solution has been limited hitherto to the manufacture of medium heavy to heavy foams, with such heavy foams of this kind having a density of 50%-90% based on a compact, in other words unfoamed polymer.

Since the foams of low density thus require a high melt strength, the temperature at the outlet from the extrusion tool has to be kept as low as possible. Due to the limited construction space, the dissipation of heat is only possible to a limited degree. Therefore, it has not been possible up to now to satisfactorily produce foams of low density in an extrusion process, when a metering apparatus of the design described above was used.

EP 0 463 759 suggests the use of a dynamic mixer for the mixing in of a foaming agent downstream of an extruder. The dynamic mixer according to EP 0 463 759 comprises a hollow cylindrical stator; which does not need to be necessarily static, as well as a cylindrical rotor which rotates inside the stator. The opposing surfaces of rotor and stator have a plurality of openings extending at the circumference, between which the material is mixed, when flowing through the mixer. The dynamic mixer is disadvantageous, because an additional amount of energy is added to the melt by the movement of the rotor and the mechanical components of the dynamic mixer are more sophisticated in their manufacture and maintenance.

As a solution to the problem, the cooling capacity could be increased, which certainly conflicts with the limitation of the maximum heat exchanger surface available. Thus, the cooling capacity approaches a maximum boundary value. As a matter of routine, the person of ordinary skill in the art will definitely consider using materials with higher heat transfer coefficients in the design of the metering device and also of the static mixer element.

As a further solution, the person of ordinary skill in the art could consider extending the extrusion device in order to enlarge the heat exchanger surface. Then a further problem emerges however. The extension of the extrusion device results in a higher loss of pressure, which is likewise undesirable, the reason being, among other things, because the throughput capacity of the extrusion device is reduced by the increased build-up of pressure and/or the introduction of energy into the melt is increased, which in turn requires a higher cooling performance.

Accordingly, it is an object of the invention to produce lower density foams, i.e. in particular foams with a density of less than 50%, preferably less than 20%, particularly preferably less than 10% related to a compact, or rather unfoamed polymer.

Briefly, the invention provides an apparatus for the production of foam comprising an extrusion device for the plastification of a polymer melt, a heat exchanger for the cooling of the polymer melt and a connection piece connecting the extrusion device to the heat exchanger for conveying the polymer melt from the extrusion apparatus to the heat exchanger. In addition, the apparatus includes a metering device in the connection piece for the introduction of a foaming agent into the polymer melt and a static mixer in the connection piece downstream of the metering device for homogenisation of the polymer melt and foaming agent together.

The metering device can, in particular, include a fluid injection nozzle.

Additionally, the extrusion apparatus can also include a fluid injection nozzle or a metering device in accordance with EP 1892034 or DE 198 53 021 A1.

The connection piece can be formed as a passage through which the polymer melt flows. The passage can in particular be annular, or rather formed as an annular gap. The foaming agent preferably includes a physical foaming agent, in particular $CO_2$, $N_2$, $H_2O$ or a combination of these.

The heat exchanger can be formed as an extrusion device. Alternatively, the heat exchanger can be formed as a static apparatus which, for example, has an internal space for the polymer melt containing a foaming agent and which includes installations, with it being possible to direct coolant through at least some of the installations to cool the mixture of polymer melt and foaming agent.

In accordance with the invention, the method for the manufacture of a foam of low density includes the following steps of:
  plastification of a polymer in an extrusion device
  metered addition of a foaming agent to the polymer melt in a metering device for the production of a polymer melt containing foaming agent
  cooling of the polymer melt containing foaming agent in a heat exchanger
wherein, after leaving the extrusion device, the polymer melt flows into a connection piece, which contains the metering device.

The polymer melt containing the foaming agent is advantageously homogenised in the connection piece, so that a uniform foam develops, i.e. a foam with essentially evenly distributed hollow cavities or cells. After the homogenisation, the polymer melt containing foaming agent is conveyed to the heat exchanger so that the polymer melt containing foaming agent can be cooled in order to achieve an adequate melt strength, particularly if a foam is to be manufactured with a density of less than 50%, preferably less than 20%, and particularly preferably less than 10% related to a compact, in other words, an unfoamed polymer.

The decoupling of the extrusion device and the metering device results in the advantage that the extrusion device can be optimised in relation to the plastification. Through this, it is possible that standard machines can be used without compromises having to be made with regard to the plastification performance or the processability of sensitive, for example temperature sensitive or fibrous materials. The first extrusion device can be realised at low cost for this reason.

Moreover, there is the further advantage that the metering device for the introduction of foaming agent no longer has to be arranged in the extrusion device. For this reason, dynamic mixing devices with intensive shearing mechanisms can be eliminated as a component of the extrusion device. There are advantages, particularly for the processing of sensitive materials, since exposure of these materials to high shearing forces should mainly be avoided.

Furthermore, the decoupling of the extrusion device and the metering device results in the advantage, that by the processing of polymer melts with additives containing halogens, such as flame retardants, in particular with the addition of water as a foaming agent, reaction products containing bromides can appear only downstream of the extrusion device and consequently, a damaging of the extrusion device, in particular the plasticising screw by aggressive media can be avoided. Thereby, the life span of the plasticising screws in the extrusion device can be markedly increased.

The metering of the foaming agent takes place in a connection piece separately from the extrusion device. This connection piece can be exchangeable and, thus, the metering device for an existing plant can be simply upgraded. It is furthermore possible to quickly exchange the metering device, either to carry out a service or to replace the metering device with another metering device, if polymer melts of different composition are to be processed in the same plant. Through the modular construction of the three parts of the plant, i.e. the extrusion device, the intermediate piece with the metering device and, if required, the homogenising apparatus and the heat exchanger, each of the components can be replaced individually, so that the servicing costs can be reduced considerably.

The entire metering device can also be upgraded after the taking of a standard extrusion apparatus for compact polymer melts into service, i.e. polymer melts which do not contain any foaming agent. Each mixer element can also be installed, replaced or exchanged at a later date, since the extrusion device, including at least one cylinder with an associated worm screw, the metering device and each mixing element each represent a module in their own right.

Figure 2:
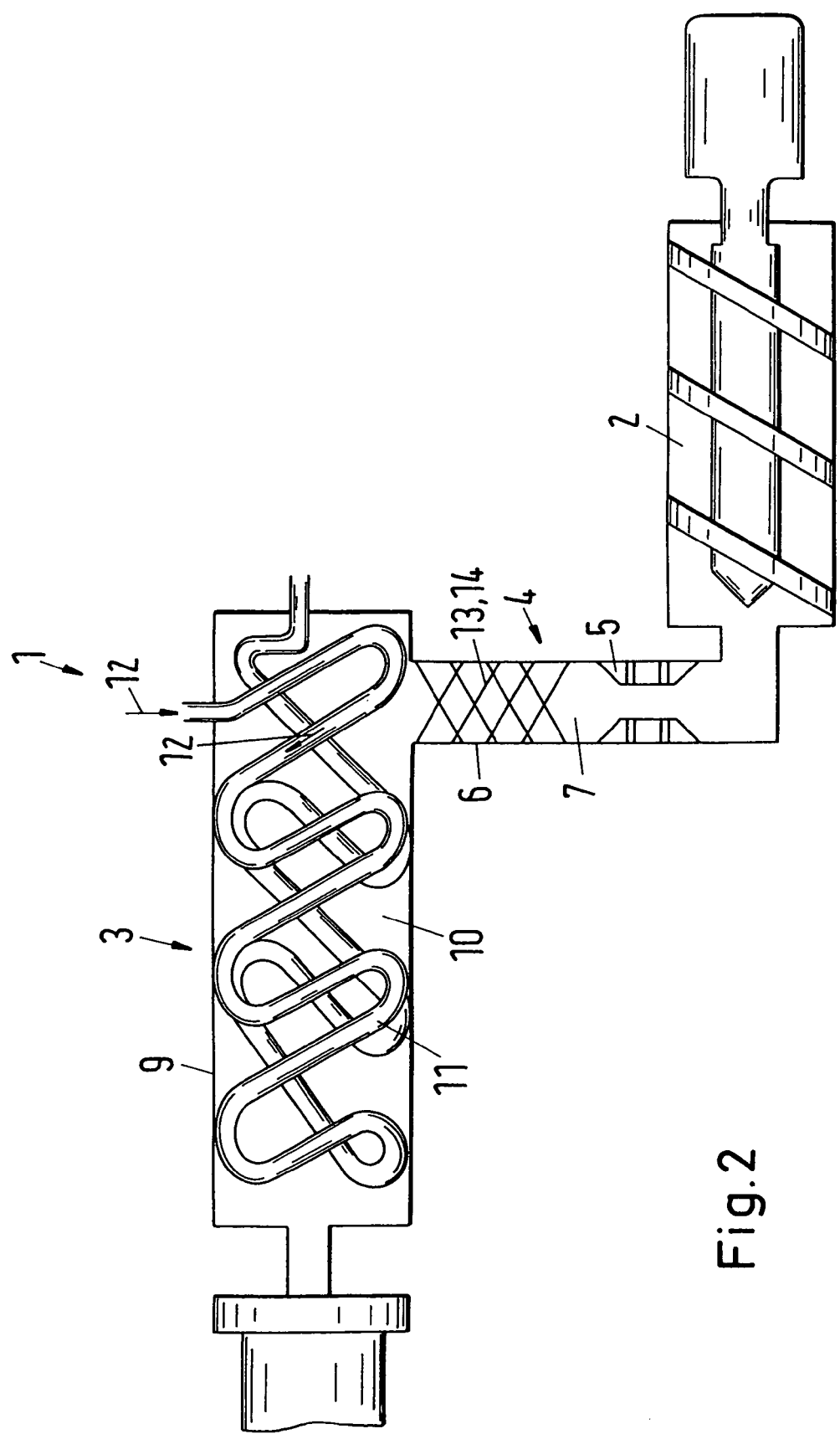

These and other objects and advantages of the invention will become more apparent from the following detailed description taken in conjunction with the accompanying drawings wherein:

FIG. 1 illustrates a section through an apparatus in accordance with the invention and in accordance with a first embodiment; and FIG. 2 illustrates a section through a second embodiment of an apparatus in accordance with the invention.

Referring to FIG. 1, the apparatus 1 for the production of foams includes an extrusion device 2 for the plastification of a polymer melt, a heat exchanger 3 for the cooling of the polymer melt and also a connection piece 4 for connecting the extrusion device 2 to the heat exchanger 3.

The connection piece 4 includes a metering device 5 for the introduction of a foaming agent into the polymer melt and a homogenising apparatus 6 after the metering device 5 for mixing the foaming agent and polymer melt together in a homogeneous manner.

In the embodiment of FIG. 1, a so-called tandem extrusion plant is used for the manufacture of extrusion forms. In this case, the extrusion device 1 takes over the tasks of plastification and pressurization, but not the tasks of the metering of and the mixing in of a foaming agent, which takes place in a confined passage 7 of the connection piece 4.

The metering device may be a metering device as described in accordance with EP 1892034 or in accordance with DE 198 53 021 A1. The metering device makes possible, in particular, an introduction of foaming agent via one or a plurality of surfaces in contact with the polymer melt.

The homogenising apparatus 6 includes an element 13 for homogenising, namely a static mixer 14, that fills the confined passage 7 of the connection piece 4. A plurality of static mixers can be arranged in series one after the other.

During operation, the mixture of polymer melt including foaming agent produced in the metering device 5 and in the homogenising apparatus 6 is introduced into the heat exchanger 3. As illustrated, the heat exchanger 3 is formed as an extrusion device, termed in the following as the second extrusion device 8. The second extrusion device 8 primarily serves for the cooling of the foaming melt and includes, in particular, a slow running screw 15, by means of which the polymer melt containing foaming agent is kept moving, but only low shearing forces are introduced. By means of the continual repositioning of the polymer melt in the second extrusion device 8, the homogenisation can be improved. At the same time, the heat transfer (cooling of the melt mixture) can be improved by the movement.

The cooled mixture of polymer and foaming agent is extruded from the heat exchanger 3 in a conventional manner for the production of foamed components or semi-finished parts of low density. In this respect, the temperature at the outlet from the extrusion apparatus 1 is kept as low as possible so that a foam of low density with a high melt strength can be subsequently obtained.

Referring to FIG. 2, wherein like reference characters indicate like parts as above, the apparatus employs a heat exchanger 3 that is formed as a static apparatus 9. This term can, for example, be understood to include a tube bundle heat exchanger. The static apparatus 9 has an internal space 10 through which the polymer melt containing the foaming agent passes and contains installations 11 of crossing tubes. A suitable coolant 12 can be directed through at least part of the installations 11 for cooling of the polymer/foaming agent mixture passing thereover.

A method for the manufacture of a foam of low density is carried out in the apparatus in accordance with FIG. 1 or FIG. 2, which includes the steps of:

plastification of a polymer in an extrusion device 2 into a melt and extruding the melt into a confined passage 7;

metering of a foaming agent via a metering device 5 into the polymer melt within a confined passage 7 during passage of the melt through the passage 7;

homogenising the polymer melt and foaming agent into a homogeneous mixture via a static mixer 14; and thereafter cooling the homogeneous mixture in the heat exchanger 3.

wherein, after leaving the extrusion device 2, the polymer melt flows into a connection piece 4, which contains the metering device 5. The polymer melt containing a foaming agent can additionally be homogenised in the homogenising apparatus 6. Subsequently the polymer melt containing a foaming agent is conveyed to the heat exchanger (3, 8, 9) after the homogenisation.

A foam with a density of less than 50%, preferably less than 20%, particularly preferably less than 10% in relation to a compact, in other words an unfoamed polymer can be manufactured by the method. In other words, the foam is more than 50% lighter, preferably up to 80% lighter, particularly preferably up to 90% lighter than a compact, i.e. unfoamed polymer.

The density of the compact, unfoamed polymer is for example for polyethylene of low density (LOPE) in the range of 910-925 ($kg/m^3$) and for a polyethylene of high density (HDPE) in the range of 941-965 ($kg/m^3$) as pointed out in the handbook "Materials Science of Polymers for Engineers", 2nd edition by Osswald, Tim A. and Menges, Georg, Carl Hanser Verlag Munich, 2003. For amorphous polypropylene, the density is about 855 ($kg/m^3$) and for crystalline polypropylene about 948 ($kg/m^3$) as indicated under www.wikipedia.org under the catchword polypropylene. When making for example use of a HDPE with a density of 950 ($kg/m^3$) foams of a density of less than 50% (475 ($kg/m^3$)), preferably less than 190 ($kg/m^3$), particularly preferred less than 95 ($kg/m^3$) can be manufactured. In particular, foams of less than 100 ($kg/m^3$) can be manufactured.

What is claimed is:

1. An apparatus for the production of a foam comprising an extrusion device for the plastification of a polymer melt, a heat exchanger for the cooling of the polymer melt, a connection piece of modular construction connecting said extrusion apparatus to said heat exchanger and defining a confined passage for conveying the polymer melt from said extrusion apparatus to said heat exchanger,
a metering device in said connection piece for the introduction of a foaming agent into the polymer melt in said passage, and
a static mixer filling said passage in said connection piece downstream of said metering device for homogenisation of the polymer melt and foaming agent passing therethrough together.

2. An apparatus in accordance with claim 1 wherein said metering device includes a fluid injection nozzle.

3. An apparatus in accordance with claim 1 wherein said heat exchanger is an extrusion device.

4. An apparatus in accordance with claim 1 wherein said heat exchanger is a static apparatus.

5. An apparatus in accordance with claim 4 wherein said static apparatus includes installations of crossing tubes for the passage of a coolant therethrough in heat exchange with a passage of a mixture of polymer melt and foaming agent thereover.

* * * * *